United States Patent [19]

Serkez

[11] 4,058,690
[45] Nov. 15, 1977

[54] TRANSMITTER CUT-OFF DEVICE

[76] Inventor: Alvin A. Serkez, 26 Tea Place, Tappan, N.Y. 10983

[21] Appl. No.: 713,395

[22] Filed: Aug. 11, 1976

[51] Int. Cl.$^2$ ............................................. H04M 1/19
[52] U.S. Cl. ..................................................... 179/167
[58] Field of Search ......................................... 179/167

[56] References Cited

U.S. PATENT DOCUMENTS

| | | | |
|---|---|---|---|
| 3,474,196 | 10/1969 | Bottos | 179/167 X |
| 3,504,138 | 3/1970 | Bottos | 179/167 |
| 3,518,380 | 6/1970 | Brennan et al. | 179/167 |
| 3,588,387 | 6/1971 | Smith | 179/167 |
| 3,688,040 | 8/1972 | Goodrich | 179/167 |
| 3,699,270 | 10/1972 | Goodrich | 179/167 X |
| 3,731,010 | 5/1973 | Goodrich | 179/167 |
| 3,748,410 | 7/1973 | Gabarini et al. | 179/167 |

*Primary Examiner*—William C. Cooper
*Attorney, Agent, or Firm*—Hubbell, Cohen, Stiefel & Gross

[57] ABSTRACT

Improved transmitter cut-off device for use in conventional hand-held telephone transmitter-receiver units, such units including a transmitter having a pair of transmitter contacts, a transmitter housing having a corresponding pair of spring contacts upon which the transmitter contacts are normally seated, and a main body having a recess in which the transmitter housing is disposed. Cut-off device includes a transmitter cap which fits over the transmitter and is removably securable to the main body, the cap having a guideway therein, the interior of the cap having a support surface located opposite the guideway, and a switch, the switch extending through the guideway and being affixed directly to the body of the transmitter, the switch being movable between a first position in which the transmitter contacts are secured in electrical conducting relation with their corresponding spring contacts and a second position in which at least one of said transmitter contacts is removed from its corresponding spring contact.

5 Claims, 3 Drawing Figures

TRANSMITTER CUT-OFF DEVICE

BACKGROUND OF THE INVENTION a. Field of the Invention

This invention pertains to telephone transmitter cut-off devices of the type wherein interruption of the transmitter circuit is effected by moving the body of the transmitter such that at least one of the transmitter contacts is moved out of electrical conducting relation with its corresponding spring contact.

b. Prior Art

Prior art devices have accomplished telephone transmitter cut-off in a variety of ways. U.S. Pat. No. 3,588,387 discloses a transmitter cut-off device in which the transmitter is moved between a first position in which the transmitter contacts are in conducting relation with their corresponding spring contacts and a second position in which at least one of the transmitter contacts is out of conducting relation with its corresponding spring contact. This device, however, requires the use of both a biasing means and a lever arm having a cam surface to control the movement of the transmitter, and the user has to maintain constant manual contact with the lever arm during the period of transmitter cut-off.

U.S. Pat. Nos. 3,688,040, 3,699,270 and 3,731,071 disclose other transmitter cut-off devices in which an insert is disposed betwen the transmitter and the spring contacts, the insert containing a pair of conducting means which complete the connection between the spring contacts and the corresponding transmitter contacts, one of these conducting means being movable by a switch between a first position in which the circuit to the transmitter via that conducting means will be opened, and a second position in which the circuit to the transmitter will be closed.

U.S. Pat. No. 2,425,061 discloses a transmitter cut-off device in which a wafer having perforations identical to the perforations on the mouthpiece of the transmitter housing is interposed between the transmitter and the mouthpiece, the wafer being rotatable between a first position in which the perforations are aligned with those of the transmitter housing and a second position in which they are out of alignment.

U.S. Pat. No. 3,474,196 discloses a transmitter cut-off device in which a mechanical switch serves to move the center spring contact in and out of conducting relation with the corresponding transmitter contact, there being no movement of the transmitter itself.

U.S. Pat. No. 3,504,138 discloses a device in which transmitter cut-off is effectuated by rotating the body of the transmitter. A piece of insulating material is placed over a portion of the outer annular transmitter contact such that when the transmitter is rotated through the proper angle the spring contact which normally comes into contact with this outer annular transmitter contact will be moved into contact with the insulating material.

None of these prior arts systems, however, provides a low cost, simple, and efficient means to effectuate transmitter cut-off in which the user need not maintain constant manual contact with the switching means during the period of cut-off.

SUMMARY OF THE INVENTION

This invention relates to a transmitter cut-off device for use in conventional hand-held telephone transmitter-receiver units. Interruption of the transmitter circuit is often desirable to eliminate background noise, or to allow the user to communicate with third parties without interrupting his telephone conversation. Typically, conventional hand-held telephone transmitter-receiver units include a transmitter housing having a disc-shaped transmitter (microphone) seated therein, a main body having a recess in which the transmitter housing is disposed, and a transmitter cap having a downwardly extending side wall, which cap fits over the transmitter and is removable secured to the body. The transmitter normally has a central transmitter contact and an outer annular transmitter contact which are seated on a corresponding pair of spring contacts located in the transmitter housing, the spring contacts in turn being connected to the transmitter circuitry. The transmitter cap serves to secure the transmitter contacts in electrical conducting relation with their corresponding spring contacts. The transmitter cut-off device of the present invention operates by allowing the user to vertically pivot the body of the transmitter such that at least one of the transmitter contacts will be unseated from its corresponding spring contact thereby interrupting the transmitter circuit.

More specifically, the transmitter cut-off device of the present invention employs a transmitter cap having a vertically extending guideway in the side wall thereof. In addition, a support surface is disposed in the interior of the side wall opposite the guideway, the support surface abutting on the upper surface of the transmitter. A manually operable switch extends through the guideway and is secured directly to the body of the transmitter, the switch being movable in the guideway between a first position in which the transmitter contacts are held in electrical conducting relation with their corresponding spring contacts, and a second position in which at least one of the transmitter contacts is unseated or removed from its corresponding spring contact thereby effectuating transmitter cut-off, the lip of the transmitter housing acting as a fulcrum upon which the body of the transmitter is pivoted.

In a preferred embodiment of the device, a pair of centrally located projections protrude into the guideway, the width of the guideway between projections being slightly less than the width of the portion of the switch extending therethrough, thereby providing a "snap-action" switching mechanism. In this way the device will remain in the "ON" or "OFF" position according to the desire of the user without the necessity of the user having to maintain constant manual contact with the switch.

Further features of the device of this invention will become apparent from the following detailed description and annexed drawings, which illustrate a preferred embodiment of the invention.

DETAILED DESCRIPTION

Figure 1:
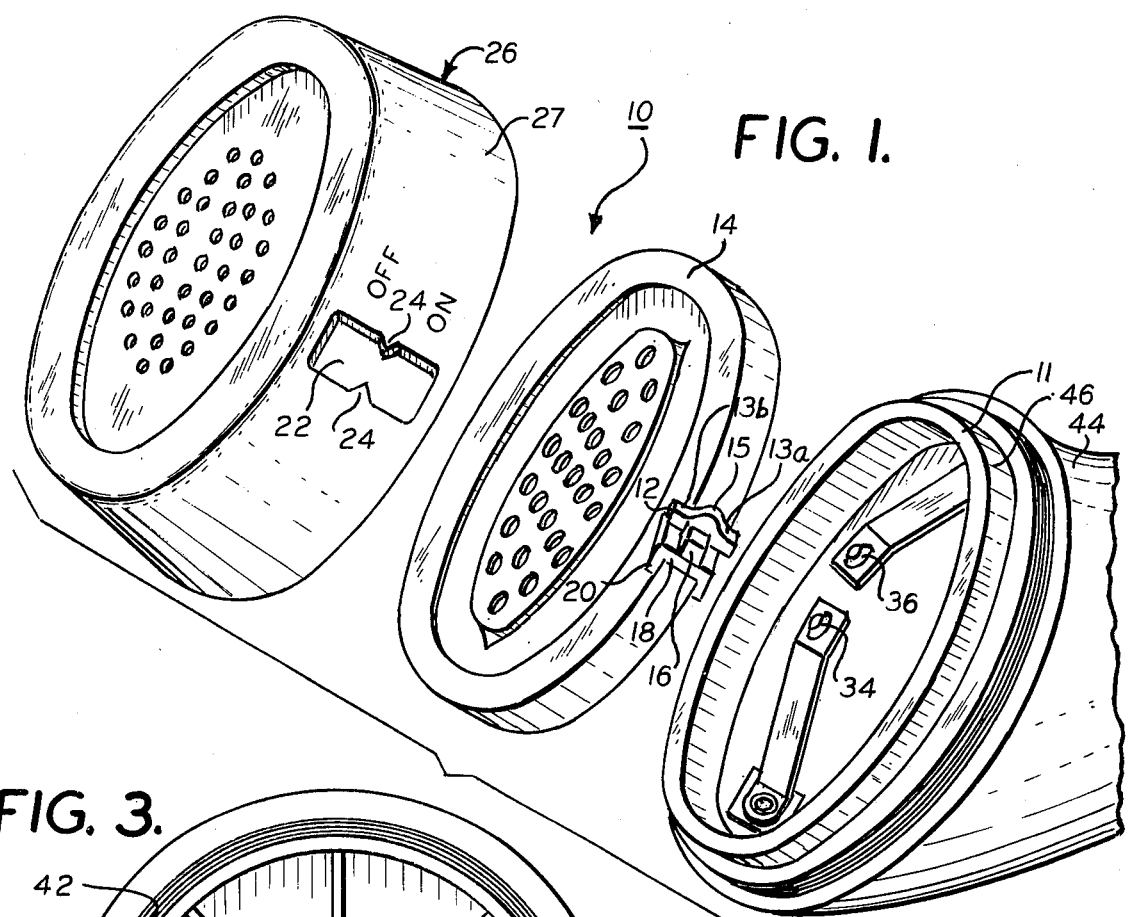
FIG. 1 is an exploded perspective view of a transmitter cut-off device according to the present invention.

Referring now to the drawings in detail and particularly to FIG. 1 thereof the telephone transmitter cut-off device, to be used in connection with a conventional hand-held telephone transmitter-receiver unit, is generally designated by the reference numeral 10. Such conventional units generally include a main body 44, a transmitter housing 46 seated in said body 44, a pair of spring contacts 34 and 36 disposed in said housing 46, and a transmitter 14. As shown, the uppermost portion of the housing 46 comprises a lip 11. The transmitter cut-off device 10 includes a transmitter cap 26 having a downwardly extending side wall 27, and a switch 15.

As shown in FIG. 1, the switch 15 is secured directly to the body of a transmitter 14, the transmitter 14 being of the conventional type found in most hand-held telephone transmitter-receiver units. The particular construction of the switch 15 as well as its method of securement to the transmitter 14 may be accomplished in a variety of ways well known in the art any of which may be advantageously employed. Preferably, and as shown, the switch 15 includes a handle 12, a central portion 16, a transverse portion 18, and a pair of grips 20, the grips 20 extending perpendicularly from the ends of the portion 18 away from the handle 12. The distance separating the grips 20 is substantially identical to the thickness of the body of the disc-shaped transmitter 14, as will be more fully understood hereinafter. While the switch 15 may be constructed of a variety of materials well known to the skilled art worker, preferably, the switch 15 is of molded plastic construction.

Figure 2:
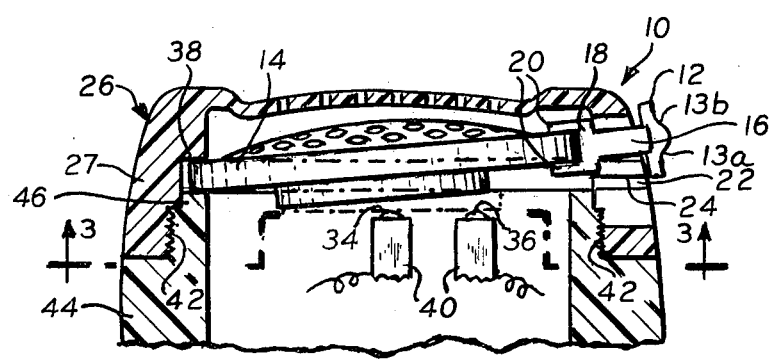
FIG. 2 is a view in vertical section showing the transmitter cut-off device of the present invention in the "ON" position (dashed lines) and in the "OFF" position (solid lines)

As shown in FIGS. 1 and 2, incorporated in the side wall 27 of the transmitter cap 26 is a guideway 22 having a pair of centrally located projections 24, it being understood that the particular shape of the guideway 22 will depend on the particular construction of the switch 15. As shown, the width of the guideway 22 is slightly greater than the width of the central portion 16 of the switch 15, except between the projections 24 where the width of the guideway 22 is slightly less than the width of the central portion 16.

The lowermost interior portion of the cap 26 is threaded as shown at 42, so that the cap 26 may replace the conventional transmitter housing cap found on most hand-held telephone transmitter-receiver units. Of course, cap 26 may be of any desired shape, depending upon the particular telephone unit in which it is desired to install the transmitter cut-off device 10. Disposed in the interior portion of the cap 26 opposite the guideway 22 is a supporting surface 38. As shown, the supporting surface 38 is so located that with the transmitter contacts 28 and 32 seated on the spring contacts 34 and 36, the surface 38 will be in confronting relation with the periphery of the upper surface of the transmitter 14, whereby when the switch is in the "ON" position vertical movement of the transmitter 14 will be prevented, as will be more fully apparent hereinafter. While construction of a suitable support surface 38 may be readily accomplished in a variety of ways well known to the skilled art worker, preferably, and as shown, the surface 38 comprises a flange incorporated in the cap 26. Moreover, the interior diameter of the cap 26 is generally identical to the diameter of the transmitter 14 so as to prevent lateral movement of the transmitter 14. While a variety of materials well known to the skilled art worker may be advantageously employed in the construction of the cap 26, preferably, the cap 26 is also of molded plastic construction.

Figure 3:
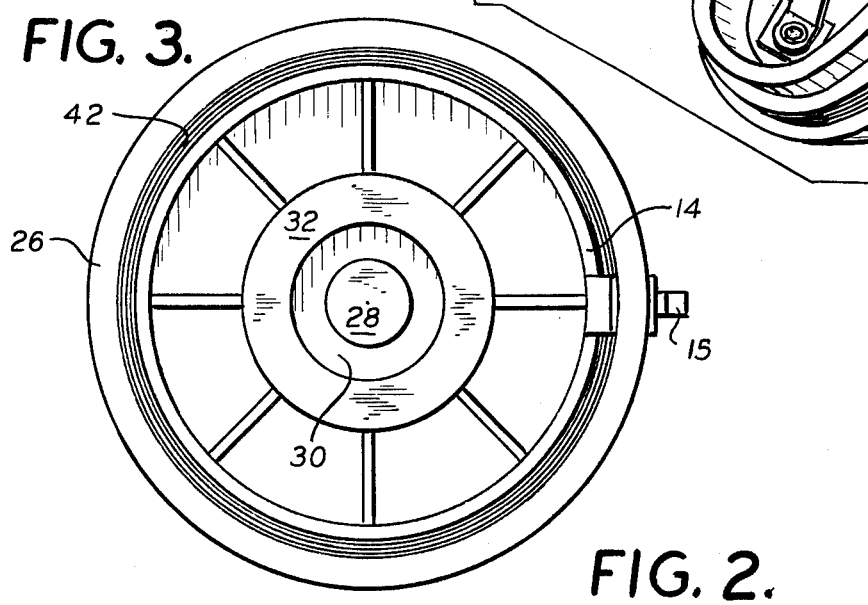
FIG. 3 is a view in horizontal section along the line 3—3 in FIG. 2 (with the main body of the transmitter-receiver unit removed) when the transmitter is in the "ON" position.

Referring now to FIG. 3, the bottom surface of the conventional disc-shaped transmitter 14 has a centrally located contact 28 and an outer annular contact 32, the contacts 28 and 32 being separated by an annular insulating section 30. As shown in FIG. 2, when the transmitter 14 is seated in the cavity defined between transmitter cap 26 and housing 46, the center 28 and outer 32 transmitter contacts are generally aligned, respectively, with the spring contacts 34 and 36, and the periphery of the bottom surface of the transmitter 14 is seated on the lip 11. In conventional hand-held telephone transmitter-receiver units the transmitter contacts are continually in electrical conducting relation with their corresponding spring contacts so that when the phone is in use, any sound waves impinging upon the upper surface of the transmitter 14 will be overheard by the receiving party, the spring contacts 34 and 36 being connected to the transmitter circuitry via the wires 40.

Referring now to FIG. 2, when the switch 15 is inserted through the guideway 22, the grips 20 embrace the periphery of the transmitter 14 in close mating relation and the central portion 16 is disposed in the guideway 22. The projections 24 provide a "snap-action" whereby the switch 15 may only be moved between the "ON" and "OFF" positions shown in FIG. 1 upon the user of the device 10 applying pressure on the handle portion 12 such that the central portion 16 of the switch 15 will be forced through the projections 24. The handle portion 12 has an arcuate surface 13 to facilitate finger control of the movement of the switch 15.

With particular reference to FIGS. 1 and 2, the operation of the device 10 will now be explained. Normally, with the transmitter 14 in operation, the center 28 and outer 32 transmitter contacts will be in conducting relation respectively with the corresponding spring contacts 34 and 36 (dashed lines in FIG. 2), and the switch 15 will be in the lower "ON" portion of the guideway 22.

With the switch 15 in the "ON" position, the flange 38 and the projections 24 cooperate to retain the transmitter contacts 28 and 32 in electrical conducting relation with the corresponding spring contacts 24 and 36, thus avoiding accidental transmitter cut-off. While the switch 15 is in the "ON" position, the operation of the phone will be identical with that of a conventional hand-held telephone transmitter-receiver unit.

When the user of the device 10 wishes to effectuate transmitter cut-off, for example, because of the presence of excessive background noise, or because the user wishes to converse with a third party without interrupting his telephone conversation, the user will simply apply finger pressure on the arcuate surface 13a and thereby force the central portion 16 through the projections 24 and into the upper "OFF" portion of the guideway 22. This will simultaneously unseat and remove at least one of the transmitter contacts 32 and 34 from its respective spring contact, the lip 11 of the transmitter housing 46 serving as a fulcrum upon which the body of the transmitter 14 will be pivoted (solid lines in FIG. 2).

Obviously, it is only necessary to lift one of the transmitter contacts off of its corresponding spring contact, as this is sufficient to interrupt the transmitter circuit with the result that any sound waves impinging upon the upper surface of the transmitter 14 will no longer be overheard by the receiving party. The "snap-action" provided by the projections 24 obviates the necessity of the user having to maintain constant manual contact with the switch 15 during the period of transmitter cut-off.

When the user again wishes to communicate with the receiving party, the user will simply apply finger pressure on the arcuate surface 13b and move the switch 15 back to the "ON" position, thus simultaneously reseating the transmitter contacts 28 and 32 upon their respective spring contacts 34 and 36, thereby completing the transmitter circuit and allowing the user to communicate with the receiving party.

While, as above-described, the pivoting of the body of the transmitter 14 may be accomplished by use of a switch affixed directly to the body of the transmitter 14, numerous other means are available for this purpose and any may be employed. For example, a rigid member may be inserted through the guideway 22, a portion of the rigid member engaging the lower surface of the transmitter 14 whereby as the rigid member is moved up and down in the guideway 22, the transmitter 14 is pivoted on the lip 11 as is more fully described above.

While I have herein shown and described an embodiment of the invention preferred at present and have suggested modifications therein, other changes and modifications may be made therein within the scope of the appended claims without departing from the spirit and scope of this invention.

What I claim is:

1. In a transmitter cut-off device for use in a conventional hand-held telephone transmitter-receiver unit, said unit including a main body; a transmitter housing having a lip, said housing being disposed in a recess in said body; a pair of spring contacts disposed in said housing; a transmitter cap having a downwardly extending side wall, said cap being removably secured to said main body; and a transmitter having an upper surface in confronting relation with said cap and a bottom surface opposite said upper surface, said transmitter being disposed in the cavity defined between said transmitter housing and said cap, the periphery of said lower surface being seated on said lip, said transmitter having a pair of transmitter contacts disposed on the bottom surface thereof, each of said transmitter contacts being seated in electrical conducting relation with its corresponding spring contact, said transmitter cut-off device being of the type wherein transmitter cut-off is effectuated by unseating at least one of said transmitter contacts from its corresponding spring contact, the improvement comprising said cap having a vertically extending guideway disposed in said side wall, the interior of said side wall opposite said guideway having a support surface, said support surface being in close confronting relation with the upper surface of said transmitter, and a manually operable actuator extending through said guideway and being secured directly to the body of said transmitter for effectuating movement of said transmitter, said actuator being movable between a first position in which each of said transmitter contacts is held in electrical conducting relation with its corresponding spring contact by the combination of said actuator and said support surface, and a second position in which at least one of said transmitter contacts is unseated form its corresponding spring contact, said lip serving as a fulcrum upon which the body of said transmitter is pivoted.

2. The transmitter cut-off device of claim 1 wherein the width of the intermediate portion of said guideway is constricted, the width of said guideway at the point of said constriction being less than the width of the portion of said actuator disposed in said guideway, said actuator being movable in said guideway between said first and second positions by forcing said actuator through said constriction.

3. The transmitter cut-off device of claim 2 wherein the width of said intermediate portion of said guideway is constricted by a pair of projections incorporated in said transmitter cap.

4. The transmitter cut-off device of claim 1 wherein said support surface comprises a flange incorporated in said transmitter cap.

5. In a transmitter cut-off device for use in a conventional hand-held telephone transmitter-receiver unit, said unit including a main body; a transmitter housing having a lip, said housing being disposed in a recess in said body; a pair of spring contacts disposed in said housing; a transmitter cap having a downwardly extending side wall, said cap being removably secured to said main body; and a transmitter having an upper surface in confronting relation with said cap and a bottom surface opposite said upper surface, said transmitter being disposed in the cavity defined between said transmitter housing and said cap, the periphery of said lower surface being seated on said lip, said transmitter having a pair of transmitter contacts disposed on the bottom surface thereof, each of said transmitter contacts being seated in electrical conducting relation with its corresponding spring contact, said transmitter cut-off device being of the type wherein transmitter cut-off is effectuated by unseating at least one of said transmitter contacts from its corresponding spring contact, the improvement comprising said cap having a vertically extending guideway disposed in said side wall, the interior of said side wall opposite said guideway having a support surface, said support surface being in close confronting relation with the upper surface of said transmitter, a manually operable actuator extending through said guideway and being secured directly to the body of said transmitter for effectuating movement of said transmitter, said actuator being movable between a first position in which each of said transmitter contacts is held in electrical conducting relation with its corresponding spring contact by the combination of said actuator and said support surface, and a second position in which at least one of said transmitter contacts is unseated from its corresponding spring contact, said lip serving as a fulcrum upon which the body of said transmitter is pivoted, and means for releasably securing said actuator in either of said first and second positions.

* * * * *